(12) United States Patent
Philippe et al.

(10) Patent No.: US 12,076,937 B2
(45) Date of Patent: Sep. 3, 2024

(54) METHOD FOR EVALUATING AN ASSEMBLY BY WELDING OF PARTS BASED ON THERMOPLASTIC MATERIALS

(71) Applicants: ARKEMA FRANCE, Colombes (FR); INSTITUT DE SOUDURE, Villepinte (FR)

(72) Inventors: Aurélien Philippe, Volstroff (FR); Philippe Klein, Rouhling (FR); Michel Glotin, Saint Cloud (FR)

(73) Assignees: ARKEMA FRANCE, Colombes (FR); INSTITUT DE SOUDURE, Villepinte (FR)

( * ) Notice: Subject to any disclaimer, the term of this patent is extended or adjusted under 35 U.S.C. 154(b) by 232 days.

(21) Appl. No.: 17/780,317

(22) PCT Filed: Nov. 25, 2020

(86) PCT No.: PCT/FR2020/052175
§ 371 (c)(1),
(2) Date: May 26, 2022

(87) PCT Pub. No.: WO2021/105614
PCT Pub. Date: Jun. 3, 2021

(65) Prior Publication Data
US 2022/0410500 A1    Dec. 29, 2022

(30) Foreign Application Priority Data
Nov. 27, 2019 (FR) ........................................ 1913344

(51) Int. Cl.
*B29C 65/02* (2006.01)
*B29C 65/00* (2006.01)
(Continued)

(52) U.S. Cl.
CPC ...... *B29C 65/8261* (2013.01); *B29C 65/1432* (2013.01); *B29C 65/16* (2013.01);
(Continued)

(58) Field of Classification Search
CPC .......... B29C 66/91221; B29C 66/9121; B29C 66/963; B29C 66/964; G01N 1/44; G01N 2001/2893
See application file for complete search history.

(56) References Cited

U.S. PATENT DOCUMENTS

| 5,902,935 A | 5/1999 | Georgeson et al. |
| 6,197,136 B1 * | 3/2001 | Hishinuma ....... B29C 66/91421 156/64 |

(Continued)

FOREIGN PATENT DOCUMENTS

| CN | 105269842 A | 1/2016 |
| CN | 109571976 A | 4/2019 |

(Continued)

OTHER PUBLICATIONS

French Search Report issued in corresponding French Patent Application No. 1913344 dated Jul. 17, 2020. (12 pages).

(Continued)

*Primary Examiner* — Scott W Dodds
(74) *Attorney, Agent, or Firm* — Boone IP Law

(57) ABSTRACT

The present invention relates to a method for evaluating an assembly by welding of parts made of thermoplastic materials, to a test piece and its associated uses, to an installation for implementing this method and to the associated welding system.

12 Claims, 5 Drawing Sheets

(51) Int. Cl.
  *B29C 65/14* (2006.01)
  *B29C 65/16* (2006.01)
  *B29C 65/26* (2006.01)
  *B29C 65/32* (2006.01)
  *B29C 65/36* (2006.01)
  *B29C 65/82* (2006.01)
  *G01N 1/44* (2006.01)
  *B29K 101/12* (2006.01)
  *G01N 1/28* (2006.01)

(52) U.S. Cl.
  CPC .............. *B29C 65/26* (2013.01); *B29C 65/32* (2013.01); *B29C 65/3604* (2013.01); *B29C 65/8253* (2013.01); *B29C 66/91221* (2013.01); *B29C 66/91216* (2013.01); *B29C 66/963* (2013.01); *B29C 66/964* (2013.01); *B29K 2101/12* (2013.01); *G01N 2001/2893* (2013.01); *G01N 1/44* (2013.01)

(56) References Cited

U.S. PATENT DOCUMENTS

| | | | | |
|---|---|---|---|---|
| 2004/0255664 | A1* | 12/2004 | Hishinuma | B29C 66/91231 73/159 |
| 2014/0124125 | A1* | 5/2014 | Nussbaum | B29C 66/8362 156/359 |
| 2016/0354974 | A1* | 12/2016 | Wang | B23K 20/106 |
| 2019/0389147 | A1* | 12/2019 | Heikkila | B29C 65/64 |

FOREIGN PATENT DOCUMENTS

| | | | |
|---|---|---|---|
| CN | 109676110 A | 4/2019 | |
| EP | 0323793 A1 * | 7/1989 | ........... B29C 66/961 |
| EP | 2801472 A1 | 11/2014 | |
| FR | 3083732 A1 | 1/2020 | |
| FR | 3083733 A1 | 1/2020 | |
| FR | 3083734 A1 | 1/2020 | |
| GB | 2082500 A | 3/1982 | |
| WO | 2020016514 A1 | 1/2020 | |

OTHER PUBLICATIONS

Hongoh, et al. "Temperature Rise and Welding Characteristics of Various-Frequency Ultrasonic Plastic Welding Systems", Japanese Journal of Applied Physics, vol. 45, No. 5B, May 1, 2006, pp. 4806-4811, XP055344927.

International Search Report (PCT/ISA/210) with translation and Written Opinion (PCT/ISA/237) mailed on Mar. 1, 2021, by the European Patent Office as the International Searching Authority for International Application No. PCT/FR2020/052175. (15 pages).

Office Action (The First Office Action) issued on Jun. 22, 2023 by the State Intellectual Property Office of People's Republic of China in corresponding Chinese Patent Application No. 2023062200102670, English Translation only. (11 pages).

Canadian Official Action in corresponding Canadian Application No. 3,158,245, Dec. 27, 2023, with English-language translation, 16 pages.

* cited by examiner

METHOD FOR EVALUATING AN ASSEMBLY BY WELDING OF PARTS BASED ON THERMOPLASTIC MATERIALS

TECHNICAL FIELD

The present invention relates to a method for evaluating an assembly by welding of parts based on thermoplastic materials, a test piece and uses thereof, an installation for the implementation of this method, and the associated welding system.

TECHNICAL BACKGROUND

Parts based on thermoplastic materials have numerous applications, in particular in the field of aeronautics for the manufacture of fuselage skin parts, frames, or stringers for aircraft. Alternatively, these parts may be parts of space equipment, automobiles, or sports equipment. These parts may comprise reinforcing fibres, e.g. carbon and/or glass fibres, dispersed in a thermoplastic polymer matrix. These parts based on thermoplastic materials are commonly known as 'composite parts' or 'composite material parts'.

For certain applications, it may be necessary to connect several composite parts, e.g. in the case of aircraft fuselage, a skin panel, stiffeners, and frames.

Various methods for assembly by welding (also known as 'welding methods' or 'manufacturing methods') by heating parts based on thermoplastic materials are known. A distinction is made between static welding methods and dynamic welding methods, in which the heating element moves relative to the parts to be welded. For example, the parts may be welded by direct or indirect heating. In particular, there are technologies based on heating an insert (or susceptor) previously deposited at the interface of the parts to be welded. The parts may be welded by applying various types of heat sources. For example, the heat source may be obtained by induction, resistance, vibration, friction, ultrasound, laser, hot gas flow, or conduction from an external heat source.

For example, application PCT/FR2019/051775, filed Jul. 16, 2019 (unpublished), which is incorporated herein by reference, describes, inter alia, a method for welding at least two rigid parts comprising a thermoplastic material and having respective surfaces to be welded, comprising: Inserting an insert between the welding areas of the two parts; providing heat via the insert; wherein the insert moves relative to the parts to be welded during welding in a welding direction D.

Depending on the welding method use and/or the type of parts to be welded, the quality of the weld must be evaluated, and the welding configuration optimised, in order to determine whether the properties of the weld are satisfactory, in particular in terms of performance, effectiveness, speed, integrity, and homogeneity. Indeed, the use of such methods on an industrial scale and on large parts may have an impact on the reliability and reproducibility of the quality of the weld, and requires satisfactory control of the heating of the parts to be welded. Optimising of the welding configurations also limits the disadvantages of certain methods for assembly by welding, in particular deformation, decompacting, and/or delamination of the welded parts, lack of homogeneity of the weld, etc.

U.S. Pat. No. 5,902,935, published on May 11, 1999, describes, inter alia, a non-destructive method for evaluating the quality of the welding of parts based on thermoplastic materials using electromagnetic pulses to induce vibrations in the insert and by analysing a resultant acoustic signal.

There is thus a real need to provide a method for evaluating the assembly by welding of parts based on thermoplastic materials, in particular the performance, effectiveness, speed, integrity, and/or homogeneity of the weld.

There is also a real need to provide a method for evaluating the thermal profile of parts based on thermoplastic materials when they are assembled by welding.

There is also a real need to provide a method for calibrating the configurations for welding parts based on thermoplastic materials.

There is also a real need to provide a method for testing an assembly by welding of parts based on thermoplastic materials, in particular in the field of aeronautics.

There is also a real need to provide a method for monitoring an assembly by welding, in particular the means and materials used, over the course of production.

SUMMARY OF THE INVENTION

Firstly, the invention relates to a method for evaluating an assembly by welding of parts made of thermoplastic materials and having respective surfaces to be welded and free surfaces, comprising:
1. providing a test piece comprising at least two parts that overlap at least in part; wherein at least one of the part is a perforated reference part comprising at least one perforation in its thickness;
2. providing a welding installation comprising at least one heating element and at least one temperature sensor;
3. providing heat by means of the heating element;
4. measuring at least one internal temperature of the test piece by means of the temperature sensor at the level of the perforation;

wherein the heating element and the temperature sensor move in a welding direction D relative to the parts to be welded during welding.

In one embodiment, the heating element is an insert, wherein the insert is inserted between the surfaces to be welded of the two parts to be welded.

In one embodiment, the insert is heated by induction, by resistance, by friction, by ultrasound, or by using a laser through a hot gas stream, or by conduction from an external heat source, preferably by induction or resistance, more preferably by induction, or, alternatively, by resistance.

In one embodiment, the perforation is a perforation traversing all or part of the thickness of the perforated reference part.

In one embodiment, the perforation is a perforation having a square, rectangular, or circular cross-section, preferably a circular cross-section.

In one embodiment, the perforated reference part comprises at least two perforations that are aligned perpendicular to, and/or at least two perforations that are aligned parallel to, the welding direction.

In one embodiment, the perforated reference part comprises at least one first section that is perforated, one second section that is not perforated, and one third section that is perforated; wherein the perforated sections respectively comprise at least one perforation and frame the non-perforated section.

In one embodiment, the method further comprises measuring at least one temperature of the free surface of the perforated reference part (surface temperature).

In one embodiment, the surface temperature and the internal temperature are measured transversely and/or longitudinally relative to the welding direction.

In one embodiment, the method further comprises recording the temperature values.

In one embodiment, the method further comprises comparing the temperatures measured with reference temperatures.

In one embodiment, the method further comprises a step of calibrating the parameters of the method for assembly by welding.

Secondly, the invention relates to a method of assembly by welding of at least one series of parts based on thermoplastic materials and having respective surfaces to be welded and free surfaces, comprising:
1. determining the settings for welding the parts to be welded based on the evaluation of the assembly by welding of a test piece constituting a representative sample according the evaluation method described above; and
2. carrying out the assembly of the parts to be welded by welding.

Thirdly, the invention relates to a test piece for the implementation of the method for evaluating an assembly by welding of parts based on thermoplastic materials as described above, wherein the test piece comprises at least two parts based on thermoplastic materials having weld areas that are at least partially placed opposite one another and the respective free surfaces, wherein at least one of the parts is a perforated reference part comprising at least one perforation.

Fourthly, the invention relates to the use of the test piece as described above to evaluate an assembly by welding of parts based on thermoplastic materials, wherein the test piece is a representative sample of the parts, preferably for comparison to a reference, for the calibration of at least one welding parameter, for benchmarking at least one welding parameter, and/or for monitoring a method of assembly by welding.

Fifthly, the invention relates to a welding installation for the implementation of the evaluation of an assembly by welding of a test piece as described above, comprising a support for the test piece to be welded, at least one heating element, configured to heat the parts to be welded, at least one temperature sensor, configured to measure the surface and interface temperatures of the test piece, wherein the heating element and the temperature sensor are configured to move in a welding direction relative to the parts to be welded during welding.

Sixthly, the invention relates to a welding system for the implementation of the evaluation of an assembly by welding, comprising a test piece and a welding installation as described above.

DETAILED DESCRIPTION

Figure 1:
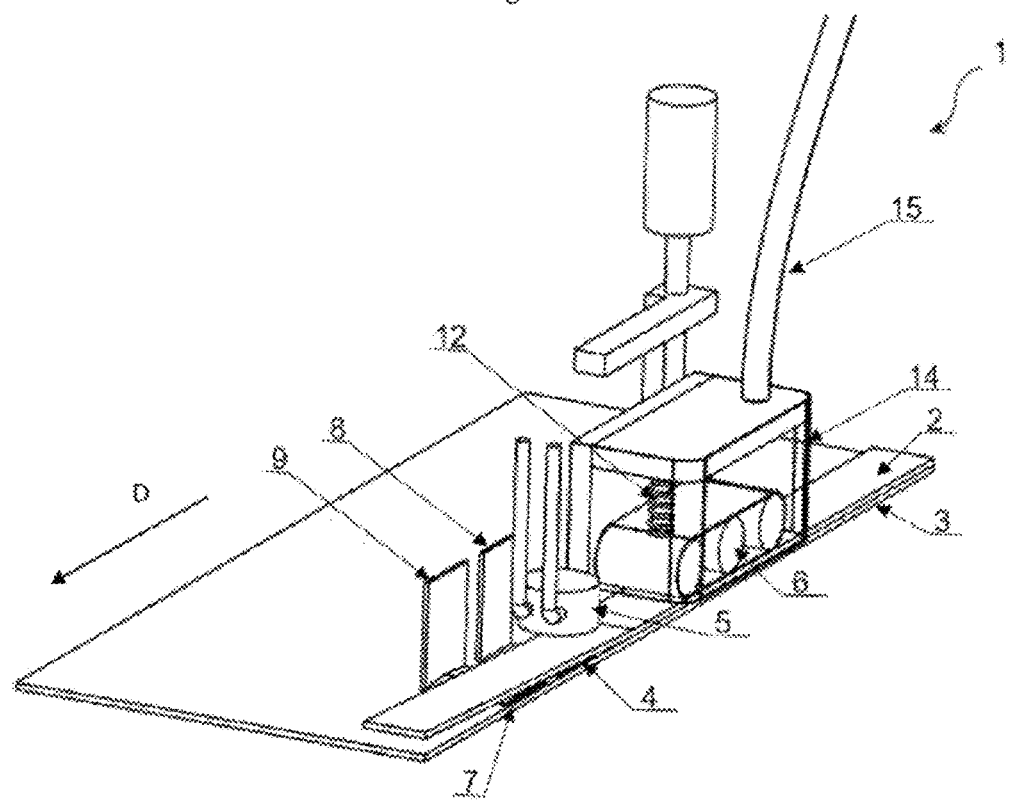
FIG. 1 shows a schematic perspective view of a welding installation 1 that may be adapted for the implementation of the method according to the invention.

The invention will now be described in greater detail and without limitation in the following description.

Definitions

'Rigid part' refers to a part that deforms little or not at all under its own weight. The rigidity of the part may be characterised by a deformation test on a test part of the part to be welded. The test part used in the deformation test must be distinguished from the test piece according to this invention. The deformation test consists of preparing a test part cut from the portion of the part to be tested having the lowest thickness (if the thickness is variable), with the test part having a length of 12 cm and a width of 1 cm. Rigidity is measured by positioning and centring the test part on two supports 10 cm apart from one another. In standard temperature (18° C.) and pressure ($1,013.10^3$ Pa) conditions, the test part has a maximum sag of 1 cm at its centre, corresponding to a deflection of no more than 10% relative to length.

'Part to be welded' refers to a part based on thermoplastic materials, i.e., a part comprising at least one matrix of thermoplastic materials. The part may be a part having a one-part structure (monolayer part) or a part having a multilayered structure (multilayered part, e.g., having 2-150 layers). A multilayered part may comprise layers having identical or different compositions.

'Composite material' refers to a material comprising reinforcing fibres in a matrix of thermoplastic material. 'Non-composite material' refers to a material lacking reinforcing fibres. 'Reference part' refers to a part corresponding to a representative sample of a part to be welded. 'Welded product' refers to a product comprising at least two parts as described above, welded together according to a method suited for the assembly by welding of parts based on thermoplastic materials.

'Welded reference product' refers to the test piece according to this invention, comprising at least two parts, including a perforated reference part, as described above, welded together according to a method suited for the assembly by welding of parts based on thermoplastic materials.

Unless otherwise stated, all percentages concerning the quantities indicated are percentages by volume.

Method for Evaluating an Assembly by Welding

The invention relates to a method for evaluating an assembly by welding of parts made of thermoplastic materials and having respective welding areas and free surfaces. The method according to the invention is implemented by means of a welding installation and a test piece as described below.

In a first aspect, the invention relates to a method for evaluating an assembly by welding of parts made of thermoplastic materials and having respective surfaces to be welded and free surfaces, comprising:
1. providing a test piece comprising at least two parts that overlap in part, as described below, wherein at least one of the parts is a perforated reference part comprising at least one perforation in its thickness;
2. providing a welding installation comprising at least one heating element and at least one temperature sensor;
3. providing heat by means of the heating element;
4. measuring at least one internal temperature of the test piece by means of the temperature sensor at the level of the perforation;

wherein the heating element and the temperature sensor move in a welding direction D relative to the parts to be welded during welding.

The method is a dynamic welding method.

The method comprises a step of providing a test piece as described below.

The method comprises a step of providing a welding installation as described infra, comprising at least one heating element and at least one temperature sensor. The heating element as described below is selected from amongst heating elements suited to implement a dynamic welding method, in particular by ultrasound, induction, vibration, or resistance. In one particular embodiment, the method may comprise providing a heating element that is an insert and a step of inserting the insert between the welding areas of the two pieces. The insert may be heated by induction, by resistance, by friction, by ultrasound, or by using a laser through a hot gas stream, or by conduction from an external heat source, preferably by induction or resistance, more preferably by induction, or, alternatively, by resistance.

The method comprises a step of measuring at least one internal temperature of the test piece by means of the temperature sensor at the level of the perforation (internal temperature).

It is particularly advantageous to provide a test piece comprising at least one perforated reference part that comprises at least one perforation. Indeed, this allows for the measurement of at least one internal temperature of the test piece at the level of the perforation, and not only the measure of at least one temperature of the free surface of the perforated reference piece (surface temperature). The internal temperature of the test piece may differ depending on the type of perforation that is made in the thickness of the perforated reference part. Indeed, when the perforation traverses the entirety of the perforated reference part (through hole), the internal temperature measured is the temperature of the welding interface, i.e., the interface of the two parts at the level of their welding areas, which are positioned opposite one another (interface temperature). When the perforation only partially traverses the perforated reference part (blind perforation), the internal temperature measured is the temperature within the thickness of the perforated reference part at a certain depth (internal temperature at a certain depth).

The method may further comprise a step of measuring at least one temperature of the free surface of the perforated reference part (surface temperature).

The temperatures may be measured using at least one temperature sensor. Various embodiments are possible depending on the type of temperature sensor that is used. The surface and internal temperatures may be measured by the same temperature sensor. Alternatively, the surface and internal temperatures may be measured by different temperature sensors.

The measurement area may correspond to different areas, in particular the preheating zone, the heating zone, the intermediate zone between heating and compression, the welding zone (compression and mechanical support), as well as the post-compression zones, depending on the position of the welding device relative to the perforations in the perforated reference part in a welding direction D, preferably at the level of the intermediate zone. 'Heating zone' refers to the area in which the parts to be welded are heated by the heating element, resulting in an increase in the temperature of the parts to be welded. The heating zone moves together with the movement of the heating element relative to the parts to be welded in a welding direction D. In one particular embodiment, the heating zone corresponds to the area in which the parts to be welded and the insert are superimposed. 'Intermediate zone' refers to the area immediately after the passage of the heating element, in which the parts to be welded have reached a temperature suitable for welding (target temperature). 'Welding zone' refers to the area in which the parts are welded together, in particular by applying pressure. When the heating element is an insert, the internal temperature measured at the heating zone, with a through perforation positioned below the insert, is the temperature of the insert. The temperature measured at the intermediate zone, immediately after the heating zone, is the maximum interface temperature of the test piece. It is particularly advantageous to measure this temperature, because it makes it possible to determine the maximum temperature reached by the parts to be welded, and whether this temperature is, e.g., less than the degradation temperature of the thermoplastic materials forming the parts. The temperature measured at the intermediate zone, immediately before the welding zone, is the temperature at the time of welding. It is also particularly advantageous to measure this temperature, because it makes it possible to correlate the quality of the weld, in particular its strength and integrity, with the welding temperature.

The internal and surface temperatures may be measured concomitantly or successively.

The temperatures may be measured on a one-off basis or continuously.

The internal and surface temperatures may be measured transversely, i.e., in a direction perpendicular to the welding direction D and to the thickness of the parts to be welded, with the surface temperature being measured at at least one solid (non-perforated) part and the internal temperature being measured at at least one part that is hollow over part or all of its thickness (perforation). The temperatures may be measured on a one-off basis, with at least one measurement point for the surface temperature and at least one measurement point for the internal temperature. Alternatively, the temperatures may be measured continuously, preferably from one edge of the test piece to the other. Depending on the type and number of temperature sensors used, the temperatures may be measured concomitantly or successively. By measuring the temperatures transversely, it is possible to evaluate the variation in the internal and/or surface temperatures over a cross-section of the test piece, in particular between the centre and the edges. This type of measurement makes it possible to evaluate the homogeneity of the internal and/or surface temperature over the entire cross-section of the test piece, any thermal variations at the edges (edge effects), etc.

The internal and/or surface temperatures may be measured longitudinally, continuously or on a one-off basis, and repeated at regular intervals, i.e., in a direction parallel to the welding direction D and perpendicular to the thickness of the reference parts, alternating solid (non-perforated) parts with hollow parts (perforations). By measuring the temperatures longitudinally, it is possible to evaluate the variation in the internal and/or surface temperatures along the test piece over the course of the welding process. This type of measurement makes it possible to measure the development of the internal and/or surface temperature along the test piece during welding (advancement of the welding means relative to the test pieces), thermal variations during welding, thermal variations over the thickness as a function of the depth and position of the welding device relative to the test piece.

Depending on the type of temperature sensor used, e.g., a thermal camera, it is possible to measure the temperatures simultaneously both transversely and longitudinally.

The method may comprise a step of preheating, in particular of the welding zone and/or the support, using any suitable means. The preheating may be carried out using infrared lamps or a hot air jet. The welding zone and/or the support must be preheated to a temperature that must remain below the melting point of all component materials of the parts to be welded. Preheating allows for better control of the temperature of the weld interface, prevention of heat flow within the welded parts, and control of the crystallisation of the materials, in particular in the welding zone. The heating may be local, in the vicinity of and perpendicular to the welding zones.

The method may comprise a step of contacting the welding areas of the two parts by applying pressure to at least one of the two parts upstream (i.e., before) and/or downstream (i.e., after) of the position of the insert relative to the welding direction D.

The method may comprise a step of cooling the welded parts. This controlled cooling step may be necessary, in particular in order to ensure good crystallisation of the polymer following welding. The evaluation method described herein also makes it possible to measure the temperatures in the preheating and cooling zones.

The method may further comprise a step of recording the surface and/or internal temperature readings. This is particularly advantageous for the manufacture of parts for the field of aeronautics such as fuselage, because the recording of these data is necessary for the qualification of a method used in aeronautics.

The method may further comprise a step of comparing the surface and/or internal temperature readings with reference internal and/or surface temperatures, in particular the anticipated theoretical surface and/or internal temperatures or surface and/or internal temperatures that have been previously measured and validated. For example, the reference temperatures may be the melting point of the thermoplastic matrix or its degradation temperature. Reference temperatures (anticipated theoretical temperatures or temperatures previously measured and validated) must be distinguished from temperatures measured by the method according to the invention; the latter temperatures are compared with the former. During welding, this comparison makes it possible to determine whether the welding method conforms to operating instructions and whether the thermal profile of the test piece corresponds to the anticipated theoretical thermal profile or the validated thermal profile. This comparison also makes it possible to qualify the welding method used without the need to measure internal temperatures of the parts to be welded during welding, as the test piece constitutes a representative sample. This is advantageous in the field of aeronautics, in which very strict safety standards apply.

This step of comparing may correspond, in particular, to a comparison of the temperatures measured with the weldability window of the method of assembly by welding. 'Weldability window' refers, in reference to a given configuration (or target configuration), to a method allowing for surface and internal temperatures to be obtained within a temperature range delimited by the melting point and the degradation temperature of the thermoplastic matrix. The configuration of the welding method corresponds to all of its target parameters, the modification of even one of which may have an impact on the surface and internal temperatures. In particular, the heating and welding temperature readings are compared to the temperature range of the weldability window for a given configuration. If the heating temperature is below and/or if the welding temperature is in excess of the temperature range, the configuration of the welding method may be adapted so that the heating and welding temperatures fall within the weldability window.

The method may further comprise a step of calibrating the configuration of the method of assembly by welding, i.e., the method for welding parts of to be welded, of which the test piece is a representative sample. This step may be implemented, in particular, following the measurement of the surface and/or interface temperatures of the test piece and after comparing with reference surface and/or interface temperatures. This step may take place, in particular, after comparing the heating and welding temperature readings with the weldability window of the welding method. By calibrating at least one target parameter of the welding method, it is possible to optimise the results thereof, in particular in terms of performance, efficacy, speed, integrity, and/or homogeneity of the weld. The target parameters may be selected from the heating temperature, the surface temperature of the upper part to be welded, the speed of movement of the welding device between the welding areas of the two parts to be welded, the pressure applied to the parts to be welded, the cooling and/or control temperature of the parts to be welded, the proximity between the insert and the inductor (induction heating), the intensity and frequency of the magnetic field (induction welding), etc. During production, the method according to the invention has the advantage of making it possible to compare and validate the performance of a welding installation at a given time to the initial approved performance of the same installation.

Welding Method

The method for evaluating an assembly by welding of a test piece may be incorporated into a method of assembly by welding of at least one series of parts based on thermoplastic materials, of which the test piece is a representative sample.

In a second aspect, the invention relates to a method of assembly by welding of at least one series of parts based on thermoplastic materials to be welded and having respective surfaces to be welded and free surfaces, comprising:

1. determining the settings for welding the parts based on thermoplastic materials and having respective welding areas and free surfaces, based on the evaluation of the assembly by welding of a test piece constituting a representative sample according the evaluation method described above; and 2. carrying out the assembly of the parts to be welded by welding.

The test piece may be welded and evaluated before welding at least one series of parts based on thermoplastic materials, of which the test piece is a representative sample. In particular, this prior evaluation makes it possible to verify that the configuration of the welding method is correct, or to calibrated it as needed.

The test piece may be welded and evaluated after welding at least one series of parts based on thermoplastic materials, of which the test piece is a representative sample. In particular, this subsequent evaluation makes it possible to verify that the configuration of the welding method has not changed/deviated over the course of its implementation.

When there are at least two series of parts based on thermoplastic materials to be welded, the test piece may be assembled by welding and evaluated between two assemblies of parts based on thermoplastic materials, of which the test piece is a representative sample. In particular, this intermediate evaluation makes it possible to verify that the configuration of the welding method remains constant.

Test Piece

The method according to the invention comprising a test piece of the parts to be welded. Here, the test piece refers to an assembly comprising at least two parts, including a perforated reference part. A reference part is a representative sample of a part to be welded, comprising a free surface (outer surface) and a welding area (inner surface), which is placed opposite the welding area of the other part to be welded.

In a third aspect, the invention concerns a test piece for the implementation of the evaluation method as described above, wherein the test piece comprises at least two parts based on thermoplastic materials having weld areas that are at least partially placed opposite one another and the respective free surfaces, wherein at least one of the parts is a perforated reference part comprising at least one perforation.

The dimensions and shape of the parts forming the test piece may vary depending on the parts to be welded, the type of method for assembly by welding used, the operating procedure, the conditions of implementation, etc. Thus, persons skilled in the art will determine the characteristics of the test pieces being used depending on the method of assembly selected, depending on the parts to be welded, etc. Thus, this invention is not limited to test pieces comprising parts having specified shapes, dimensions, and/or degrees of overlap. In particular, the test piece according to this invention may be used with any type of suitable method for welding parts based on thermoplastic materials.

The test piece comprises at least two parts. These parts may be rigid in the sense that they deform little or not at all under their own weight. Their rigidity may be characterised by a deformation test as defined above. In particular, the parts are also rigid in the thermal conditions of the welding operation, i.e., they are rigid before, during, and after welding. Each part forming the test piece may have the characteristics of the corresponding part to be welded of which it is a representative sample. Thus, by way of example, the reference part may be a part comprising non-composite or composite materials, a monolayer or multilayer part.

Each reference part may have any suitable shape; in particular, each reference part has the shape of a parallelogram, preferably square or rectangular, more preferably rectangular.

Each part may be of any suitable dimension, in particular any suitable length, any suitable width, and any suitable thickness. 'Length' refers to the dimension parallel (longitudinal) to the welding direction. 'Width refers to the dimension perpendicular (transverse) to the welding direction. The dimensions of a reference part may correspond to 1-20% of the dimensions of the corresponding part to be welded.

The parts forming the test piece overlap in whole or in part.

At least one of the parts forming the test piece is a perforated reference part comprising at least one perforation.

The perforation may traverse the entirety of the perforated reference part (through hole). Alternatively, it may traverse only part of the perforated reference part (blind hole) to varying depths.

By providing a perforated reference part, it is possible to measure at least one internal temperature in addition to optionally measuring the surface temperature at the free surface of the perforated reference part. Depending on the type of perforation made in the thickness of the perforated reference part, various internal temperatures may be measured. A through hole allows for the measurement of the interface temperature of the welding areas of the reference parts (interface temperature). A blind hole makes it possible to measure a temperature within the thickness of the perforated reference part at a given depth (internal temperature at a given depth).

The perforation may be any perforation of having any suitable cross-section, in particular a perforation having a square cross-section or a perforation having a rectangular cross-section (groove) or a perforation having a circular cross-section (bore). Grooves may have any suitable orientation, in particularly transverse, longitudinal, or oblique relative to the welding direction. Preferably, the perforations do not extend over the entire width or length of the perforated section. Indeed, such perforations may adversely affect the welding process, in particular resulting in heat dissipation and reduced strength of the welds. In one particular embodiment, the perforated reference piece comprises perforations having a circular cross-section.

The cross-section of each perforation must be necessary and sufficient to allow for the measurement of the interface temperature without significantly affecting the thermal profile of the test piece, e.g., by heat dissipation. When the cross-section of the perforation is circular, it may have a diameter between 0.5 and 10 mm. The perforated reference part may comprise at least three sections, i.e., a perforated first section, a non-perforated second section, and a perforated third section, with the perforated sections respectively comprising at least one perforation and framing the non-perforated section. 'First section' refers to the section of the part that will be welded first, i.e., before the second and third sections, relative to the welding direction D. 'Third section' refers to the section of the part that will be welded last, i.e., after the first and second sections, relative to the welding direction D. It is advantageous to provide a perforated reference part that comprises a non-perforated central section that is surrounded by two perforated sections. Indeed, the temperature readings in the perforated sections make it possible to ensure that the thermal profile of the test piece does not vary significantly over the welding process, thus making it possible to extrapolate the thermal profile of the non-perforated central section. Moreover, this central section may be used to carry out additional tests, in general, a destructive or non-destructive test, e.g., of the mechanical strength of the weld, a visual analysis, a microscopic analysis, or a physico-chemical analysis.

The perforated reference part, in particular the perforated first and/or third section, may comprise at least two perforations, preferably at least three perforations, aligned perpendicular to the welding direction D. These perforations may be located in different sites aligned perpendicular to the welding direction D, e.g., in the centre, near one of the edges, etc. In one particular embodiment, at least one of the perforated sections of the perforated reference part comprises at least three adjacent transverse perforations, including a first perforation located in the vicinity of one edge of the part, a second perforation located in the centre, and a third perforation located in the vicinity of the opposite edge of the part. This arrangement allows for the measurement and comparison of temperatures at different sites over the width of the part, and thus for the observation of the transverse thermal profile of the part. For example, when the perforations are respectively located in the centre and at opposite edges of the part, the measurement and comparison of the temperatures allows for observation of temperature differences over the width of the part, in particular edge effects.

The perforated reference part, in particular the perforated first and/or third section, may comprise at least two series of longitudinal perforations, preferably at least three series of perforations, aligned parallel to the welding direction D. 'Series of longitudinal perforations' refers to series of perforations—particularly of identical shape, dimensions, and location in the transverse direction—that repeat regularly over the length of a perforated section. This arrangement allows for the measurement and comparison of temperatures at different sites over the length of the part, and thus for the observation of the longitudinal thermal profile of the piece, and thus of the weld over the length of the part.

Adjacent transverse perforations and series of longitudinal perforations may form a specific pattern, in particular a regular geometric pattern. The perforations may form a chessboard or quincunx pattern. When the pattern is regular, the distance between two adjacent transverse perforations and/or between two adjacent longitudinal perforations is uniform. The perforated section of the perforated part may have the same perforation pattern or different patterns, preferably the same pattern. In one particular embodiment, the perforated sections comprise a chessboard pattern comprising three adjacent transverse perforations and at least three series of longitudinal perforations.

The perforated reference part may comprise various types of perforations, i.e., at least one through hole and at least one blind hole, preferably at least two blind holes. By providing a perforated reference part with different types of perforations, it is possible to measure a temperature gradient running from the free area of the perforated reference part to the interface of the two parts to be welded.

The perforation may be without any material. Alternatively, the perforation may comprise a transparent material allowing for the measurement of the temperature by a suitable temperature sensor, e.g., a thermal camera as described below. Filling the perforation with a transparent material has the advantage of allowing for the measurement of the internal temperature whilst acting as a thermal insulator to limit convective losses.

The second component part of the test piece may be a part to be welded or a representative sample thereof. The evaluation method according to the invention may be implemented using a test piece comprising only reference parts, including the perforated reference parts, corresponding to representative samples of the parts to be welded. Alternatively, the evaluation method according to the invention may be implemented using a test piece comprising a perforated reference part corresponding to a representative sample of a first part to be welded, and a second part to be welded as such. In this embodiment, the perforated reference part is used directly in situ with the second part to be welded.

The second reference part may be perforated or non-perforated, preferably non-perforated. The perforated part and the second part are preferably the upper and lower piece of the test piece, respectively. The terms 'upper' and 'lower' are defined relative to their position on the welding installation on which the parts to be welded are positioned for the purpose of assembly.

Figure 2:
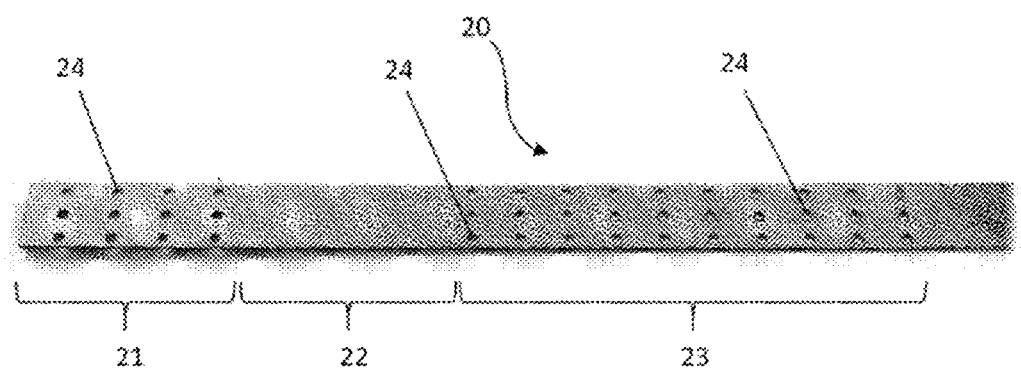
FIG. 2 is a perspective view of a perforated reference part 20.

A perforated reference part 20 is shown in FIG. 2. It comprises a perforated first section 21, a second, non-perforated central section 22, and a perforated third section 23. The first section 21 and the third section 23 each comprise four and ten longitudinal series of three perforations 24 having circular-cross sections, respectively.

Figure 3:
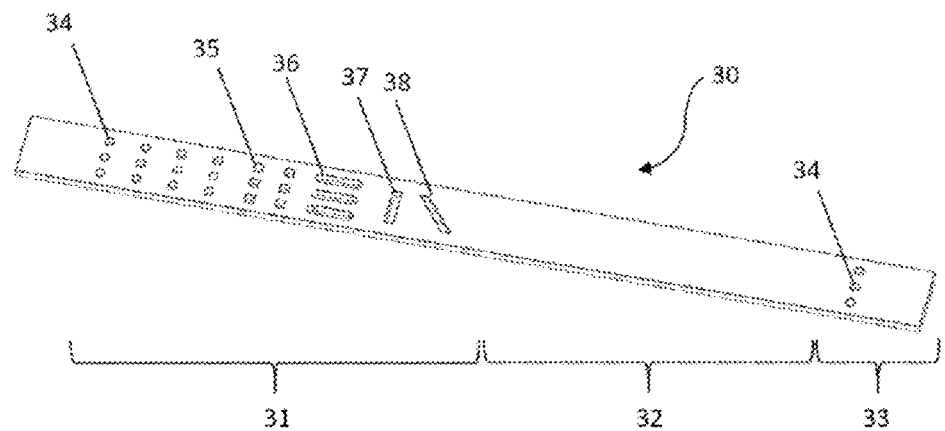
FIG. 3 is a perspective view of a perforated reference part 30.
Figure 4:
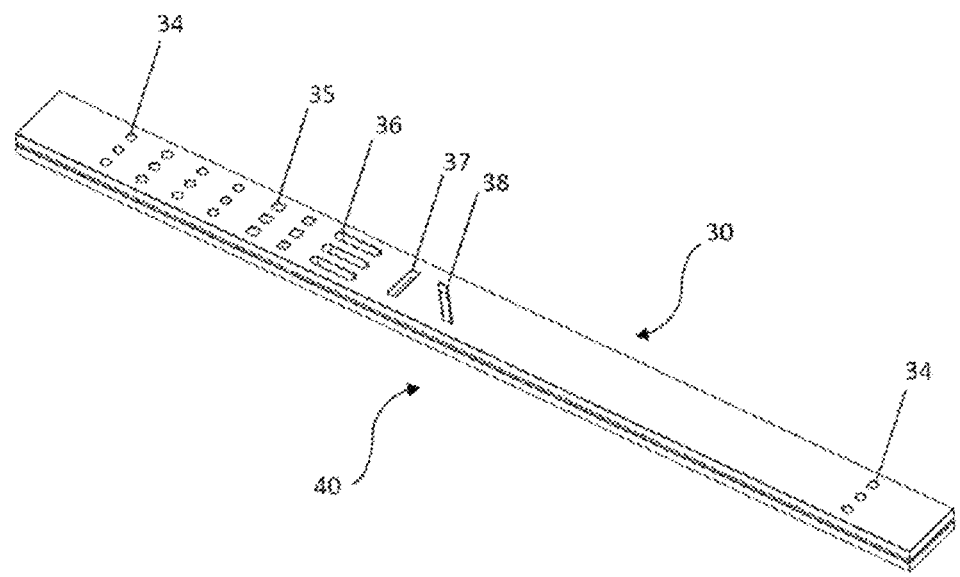
FIG. 4 is a perspective view of a test piece comprising a perforated reference part 30 and a non-perforated reference part 40 according to this invention.

A perforated reference part 30 is shown in FIGS. 3 and 4. It comprises a perforated first section 31, a second, non-perforated central section 32, and a perforated third section 33. The first section 31 comprises perforations having different cross-sections, i.e., perforations 34 with circular cross-sections, perforations 35 having square cross-sections, and longitudinally 36, transversely 37, or obliquely 38 orientated perforations (grooves) having rectangular cross-sections. The third section 33 comprises a series of three perforations 34 having circular cross-sections.

In FIG. 4, the perforated reference piece is associated with a non-perforated reference part 40 having identical shape and dimensions.

Figure 5:
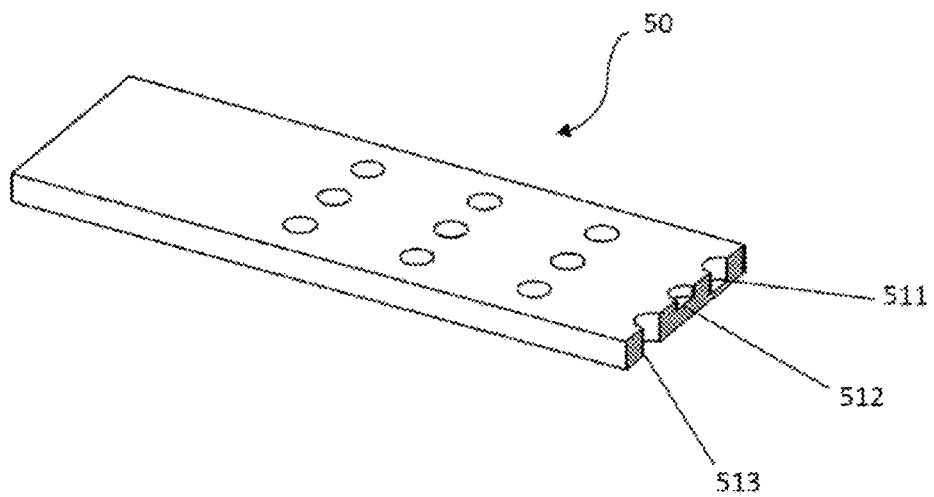
FIG. 5 is a perspective view of a perforated first section of a perforated reference part 50.
Figure 6:
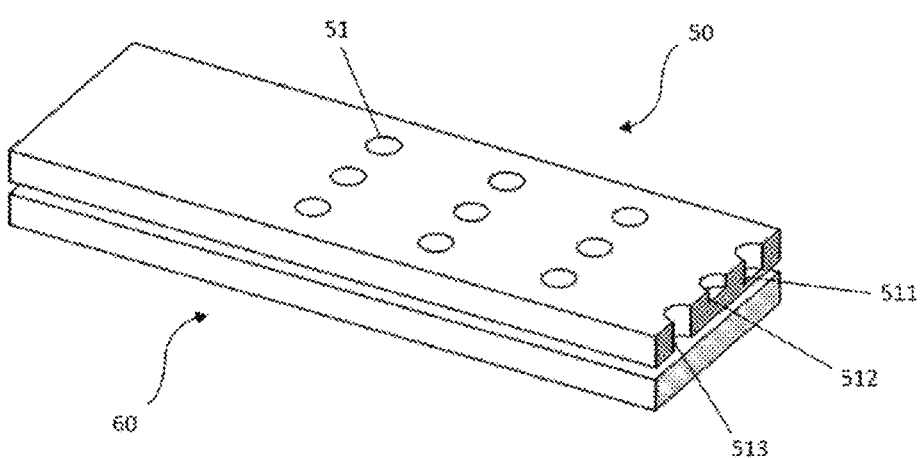
FIG. 6 is a perspective view of a portion of a test piece corresponding to the perforated first section of a perforated reference part 50 and the corresponding section of the second reference part 60.
Figure 7:
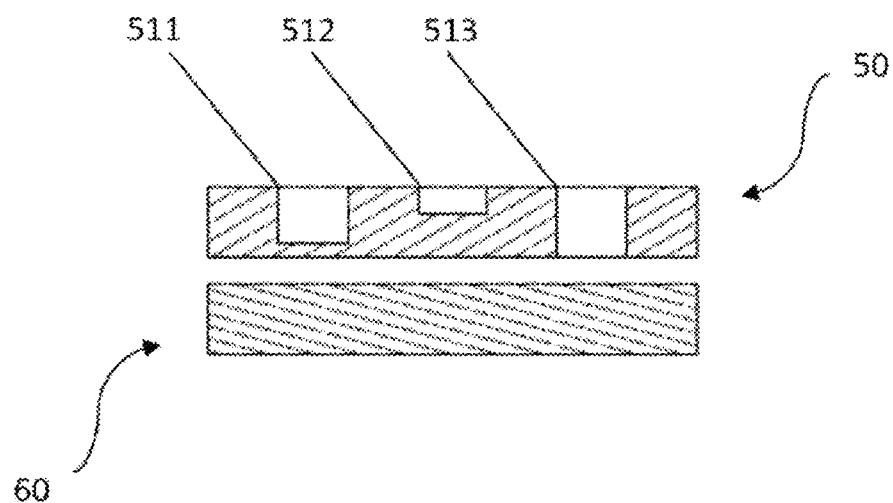
FIG. 7 is a cross-section of a test piece at the level of an alignment of perforations of a perforated reference part 50 and the corresponding second reference part 60.

A portion of the perforated first section of a perforated reference part 50 is shown in FIGS. 5, 6, and 7. The first section comprises perforations 51 of different lengths having circular-cross sections, with the perforations being through holes 513 or blind holes 511, 512. In FIGS. 6 and 7, the perforated first portion of the perforated reference part 50 is associated with the corresponding section of the second, non-perforated reference part 60, having identical shape and dimensions.

The reference parts, or at least one of their component layers, may comprise a matrix based on thermoplastic materials. The layers may comprise the same thermoplastic materials or different types/grades of compatible thermoplastic materials. The thermoplastic materials may be selected from polyamides (PA), e.g. a polyphtalamide (PPA), PA 11, PA 12, PA 6, PA 1010, PA 66, PA 46, or a copolyamide; polysulphones; phenylene polysulphide (PPS); polyimides, e.g. polyetherimides (PEI); polyaryletherketones (PAEK), e.g. polyetherketoneketones (PEKK) and/or polyetheretherketones (PEEK); ethylene polyterephtalate; polyolefins, e.g. polypropylene; chlorinated polymers, e.g. polyvinyl chloride (PVC) and polyvinylidene fluoride (PVDF); acrylic or methacrylic polymers, or mixtures thereof. The thermoplastic material may be an amorphous, crystalline, or semi-crystalline thermoplastic material.

Each reference part may consist (substantially) of thermoplastic material. Alternatively, each reference part may comprise a quantity of thermoplastic material matrix of 20-75 vol %, preferably 30-55 vol %, relative to the total volume of the part.

The reference parts, or at least one of their component reference layers, may further comprise functional additives, preferably functional additives selected from surfactants, UV stabilisers, thermal stabilisers, biocidal agents, impact modifiers, expansion agents, or mixtures thereof.

The reference parts may comprise 0-30 vol % of functional additives.

The reference parts, or at least one of their component layers, may further comprise fillers, in particular fibrous and/or non-fibrous fillers.

Non-fibrous fillers may be selected from mineral fillers, in particular alumina, silica, calcium carbonate, titanium dioxide, glass beads, carbon black, graphite, graphene, carbon nanotubes, or mixtures thereof.

Fibrous fillers may be selected from cut fibres or continuous reinforcing fibres. In particular, reinforcing fibres stiffen the parts.

Reinforcing fibres may be selected from glass fibres, quartz fibres, carbon fibres, graphite fibres, basalt fibres, silica fibres, metal fibres, ceramic fibres, natural plant fibres, synthetic organic fibres, or mixtures thereof.

Each reference part may comprise 25-80 vol %, preferably 45-70 vol %, of reinforcing fibres, relative to the total volume of the part.

In a fourth aspect, this invention concerns the use of the test piece as described above to evaluate a method of assembly by welding of parts based on thermoplastic materials, wherein the test piece is a representative sample of the parts, preferably for comparison to a reference, for the calibration of at least one welding parameter, for benchmarking at least one welding parameter, and/or for monitoring a method of assembly by welding.

Weld

Other than the parts to be welded, no other thermoplastic material is added during the welding process, in particular at the interface of the welding areas. The weld between the two parts to be welded is thus formed by the matrices of thermoplastic materials of the parts themselves, in particular by interpenetration.

Installation

The welding method is implemented using a welding installation.

In a fifth aspect, this invention relates to a welding installation for the implementation of the method for evaluating an assembly by welding of a test piece as described above, comprising: a support for the test piece to be welded, at least one heating element, configured to heat the parts to be welded, at least one temperature sensor, configured to measure the surface and/or internal temperatures of the test piece, wherein the heating element and the temperature sensor are configured to move in a welding direction D relative to the reference pieces during welding.

The evaluation method according to the invention may be implemented with any suitable conventional welding installation, in particular by adding a temperature sensor. A particularly suitable welding installation is the welding installation 1 described in application PCT/FR2019/051775, filed on Jul. 16, 2019 (unpublished). A schematic perspective view of the installation 1 is shown in FIG. 1. In particular, the welding installation 1 according to application PCT/FR2019/051775 comprises: a support (not shown) for parts to be welded 2, 3; an insert 4 comprising a material sensitive to induction, situated at the end of a first arm 8; a corresponding inductor 5; a spacer element 7 located at the end of a second arm 9; a vibrator 12; a temperature-controlled enclosure 14 supplied by a blow pipe 15; compaction rollers 6 surrounded by a track. Such conventional installations may be adapted, in particular, by adding a temperature sensor. The installation comprises a support for at least one of the parts of the test piece, preferably the non-perforated reference part. This support preferably includes a flat surface or a surface of any other suitable shape for carrying one of the parts of the test piece.

The installation comprises a heating element. Any heating element suited for the implementation of a dynamic welding method according to the invention may be used, in particular induction heating, resistance heating, vibration heating, friction heating, ultrasound heating, laser heating, hot gas stream heating, or conduction heating from an external heat source.

In one particular embodiment, the heating element is an insert. The insert is configured to be inserted between the welding areas of the two parts of the test piece. The insert may be heated by any suitable heating means, in particular by induction, by resistance, by friction, by ultrasound, or by using a laser, by a hot gas stream, or by conduction from an external heat source.

The insert comprises a material suited to the heating means.

For induction heating, the insert comprises a material sensitive to induction, and the insert is heated by induction (inductive effect). The inductive effect is generated by applying a magnetic field generated by an inductor. The material sensitive to induction may be a material that acts as a susceptor or absorber of a magnetic field, preferably a metal material sensitive to induction, more preferably a metal material selected from iron, steel (e.g. stainless steel), aluminium, nickel-chrome, titanium, or combinations thereof.

For resistance welding, the insert comprises a resistive conductive material, and the insert is heated by resistance (or Joule effect). The conductive resistive material may be selected from alloys of nickel, lead, titanium, manganese, nickel-chrome alloys, iron-chrome-aluminium alloys, and nickel-copper alloys. The resistive effect is generated by applying an electrical current.

For laser welding, the insert may be heated directly by at least one laser. Alternatively, the insert may comprise a network of optical fibres allowing for the laser heat energy to be directed to the welding areas.

For hot gas stream welding, the insert may be directly heated by the hot gas stream, e.g. by contact. Alternatively, the insert may comprise at least one channel allowing for the circulation of the hot gas stream within the insert.

For conduction welding, the insert may be heated by any suitable external heat source.

Advantageously, the insert is a plate. The insert has a thickness of 5 mm or less, preferably from 0.3 to 5 mm; more preferably from 0.3 to 3 mm, more preferably from 0.5 to 1.5 mm, even more preferably from 0.5 to 1 mm.

'Thickness' refers to the dimension between the surfaces of the insert that are in contact with the welding areas. If the surfaces of the insert are not flat and parallel to one another, the thickness corresponds to the maximum dimension between these two surfaces. Such thicknesses ensure the rigidity of the insert, good heat transfer, and low mechanical deformation of the rigid parts during the passage of the insert, and makes it possible to weld rigid parts.

During welding, the insert moves relative to the parts to be welded in a welding direction D. The movement of the insert relative to the parts to be welded may occur by moving only the parts to be welded (with the insert remaining fixed relative to the support) or, alternatively, by only moving the insert relative to the support (with the parts remaining fixed relative to the support).

The installation may further comprise at least one arm, at the edge of which the welding device, i.e., the insert, is arranged. The insert may be attached to the arm in an integral fashion.

The installation comprises at least one temperature sensor. This sensor makes it possible to measure the surface temperatures of the parts of the test piece, in particular the surface temperatures of the upper perforated part. This sensor also makes it possible to measure the internal temperatures of the test piece, at the perforations of the perforated sections of the perforated reference part.

The sensors may be selected from pyrometers, thermocouples, thermal cameras, etc. In one particular embodiment, the temperature sensor is a thermal camera. The thermal camera provides a real-time image of the perforated reference part. It is possible to define a capture zone within this image, with the capture zone preferably corresponding to the intermediate zone between the heating zone and the welding zone. It is particularly advantageous to use a thermal camera because it makes it possible to measure all of the temperatures of interest, both transversely and longitudinally, in particular the surface temperature of the perforated reference part, the interface temperature, in particular the maximum temperature at the interface of the parts to be welded at the intermediate zone immediately after the heating zone or the welding temperature in the intermediate zone immediately before the compression zone; the internal temperature of the perforated part at a given depth, the temperature of the heating element, if applicable, in particular the temperature of the insert for induction welding.

The temperature sensors may measure the surface and internal temperatures of the parts to be welded continuously or on a one-off basis.

The temperature sensor may be positioned in various zones, in particular the preheating zone, the heating zone, the intermediate zone, the welding zone, etc. The temperature sensor is preferably positioned at the intermediate zone, after heating and before welding.

During welding the temperature sensor and the heating element move together relative to the parts to be welded being welded in the welding direction D. 'Moving together' refers to moving simultaneously, in the same direction (here: the welding direction D), and at the same speed.

When the heating element is an insert, the temperature sensor is joined with the arm to which the insert is affixed.

For induction welding, the installation may further comprise at least one inductor to generate a magnetic field.

During welding, the inductor may move relative to the parts to be/being welded in a welding direction D. Advantageously, the insert and the inductor move together relative to the parts to be welded during welding in a welding direction D.

The inductor may be joined with the arm of the insert.

The installation may further comprise at least one pressing element, in particular at least one plating roller and/or at least one compaction roller. These pressing elements may be positioned behind and/or in front of the insert relative to the welding direction D. The pressing elements make it possible to apply a pressure to the parts such that they are pressed against one another. The installation may further comprise at least one thermal regulation unit.

The thermal regulation unit makes it possible to reduce the temperature of the free surfaces of the welded part relative to the welding temperature whilst keeping the welding areas, and thus the welding interface, at a temperature in excess of the melting point of the thermoplastic polymer.

The thermal regulation unit is preferably positioned behind the insert relative to the welding direction D and in front of the pressing elements (if any).

This cooling step makes it possible to control the temperature gradient within the welded part, and limits or prevents decompacting.

The installation may further comprise a temperature-controlled enclosure that delimits two zones located inside and outside the enclosure, respectively. This enclosure makes it possible to keep a zone of the parts at a specific temperature. This may be a recrystallisation temperature, behind the insert relative to the welding direction D, in order to allow for recrystallisation in optimal conditions and avoid post-curing of the parts after welding. The cooling may take place outside of the welding zone.

The temperature-controlled enclosure is positioned at the welding zone, preferably in front of and/or behind the insert relative to the welding direction D.

During welding, the temperature-controlled enclosure and the insert may move together relative to the parts to be/being welded in the welding direction D. The temperature-controlled enclosure may be joined with the arm of the insert and/or of the inductor (if any).

The temperature of the zone delimited by the enclosure and/or the zone outside it may be obtained by insufflation of a fluid, preferably hot air or cold air, respectively, using one or more blow tubes.

The temperature-controlled enclosure may be delimited by a flexible skirt, which may be affixed to the periphery of an upper plate.

Welding System

In a sixth aspect, this invention relates to a welding system for the implementation of the evaluation of an assembly by welding, comprising a test piece and a welding installation as described above.

Automation of Movement

The movements of the heating element/welding device and/or temperature sensor and/or inductor (if any) and/or pressing elements and/or temperature-controlled enclosure may be carried out automatically by one or more robots, or, in the alternative, manually by an operator. Such embodiments are particularly advantageous for assembling fuselage parts in the field of aeronautics, because the welding temperature must be controlled in order to qualify an aeronautic process.

EXAMPLES

The following examples illustrate the invention without limitation.

Providing a Test Piece According to the Invention

The test pieces used in the tests set forth below comprises two parts based on thermoplastic materials having respective welding areas and free surfaces, including a perforated reference part.

The perforated reference parts 20, as shown in FIG. 2, comprise a PPS polymer-based (43 wt %) thermoplastic matrix as well as carbon fibre weave. These pieces have a thickness of approximately 1.86 mm, a length of approximately 500 mm, and a width of approximately 35 mm. They comprise a perforated first zone 21 comprising four longitudinal series of three transverse perforations 24, a second central zone 22 without perforations, and a perforated third zone 23 comprising ten longitudinal series of three transverse perforations. The perforations 24 are through holes and have a diameter of approximately 5 mm.

The second part (not shown) of the test piece corresponds to a part identical to the reference part 20 of FIG. 2, but without any perforations.

Two different test pieces were tested, i.e., a first test piece having reference parts comprising a PPS polymer-based thermoplastic matrix comprising 5HS carbon fibre weave; or a second test piece having reference parts comprising a PEKK polymer-based (Kepstan 7002™) (37 wt %) thermoplastic matrix comprising Hextow As7 unidirectional carbon fibres.

Providing a Welding Installation

A welding installation, similar to that shown in FIG. 1, comprising, in particular, a support, an insert affixed to the end of an arm, an inductor, a thermal camera (heating element), and a compacting roller is provided. The inductor and the thermal camera are joined with the arm of the insert and thus move together with the insert.

The surface and internal temperatures of the test piece are measured at the intermediate zone, i.e., immediately after the heating zone and before the welding (compacting) zone. The surface temperatures are measured at the solid zones of the perforated reference piece. The internal temperatures (at the interface between the two parts to be welded) are measured at the perforations.

Implementation of the Method According to the Invention

The method according to the invention may be implemented with various predetermined configurations. By modifying at least one target parameter, e.g., the temperature of the insert, it is possible to modify the implementation of the welding of the test piece and have an effect on its performance. In particular, modifying at least one parameter will affect the surface and internal temperature readings.

Figure 8:
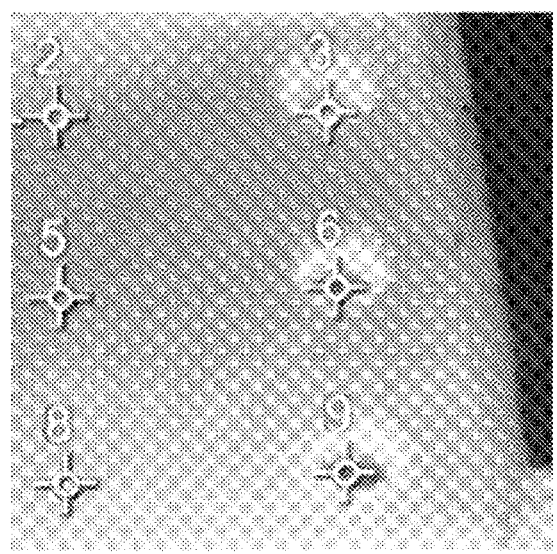
FIG. 8 is an image of surface and interface temperatures of a test piece obtained by a thermal camera in the intermediate area.
Figure 9:
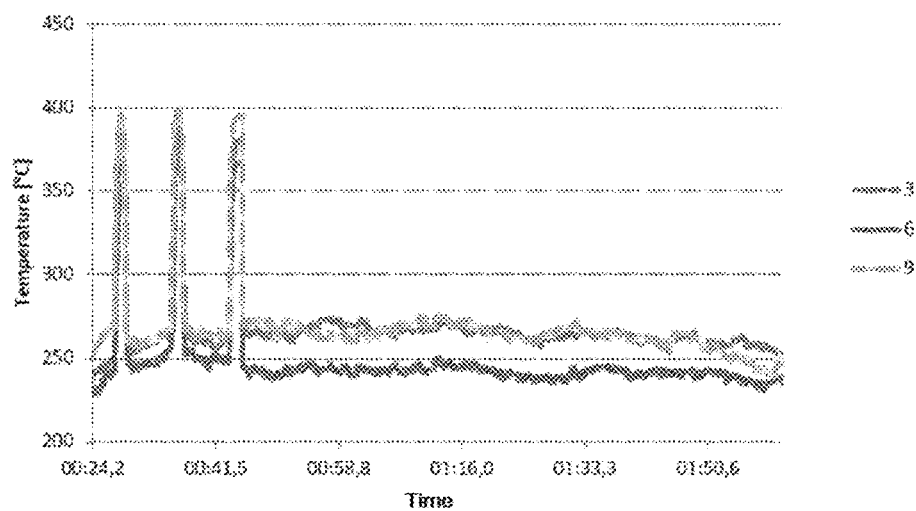
FIG. 9 is a graphic representation of the surface and interface temperatures of a test piece as a function of time, measured by a thermal camera in the intermediate zone during assembly by welding according to the method according to the invention.

Measuring Surface and Internal Temperatures of the Test Piece Consisting of Two Kepstan 7002™/Hextow AS7 Reference Parts FIG. 8 is a real-time image of the perforated reference part 20 obtained with a thermal camera according to a given configuration. This image from above the perforated reference part 20 illustrates the differences in temperature readings between the solid (non-perforated) and hollow parts (perforations 24) where the surface and interface temperatures (° C.) are respectively measured. The interface temperatures of the third, sixth, and ninth perforations can be seen in bright grey, whilst the surface temperature of the solid zone surrounding the perforations is in dark grey, showing that the surface temperature is below the interface temperatures. FIG. 9 is a graphic representation of the surface and interface temperatures (° C.) measured/recorded as a function of time during the joint movement of the insert and thermal camera at the intermediate zone, immediately before the passage of the compacting device, and thus before welding. The interface temperatures measured at the perforations have a value of approximately 360-390° C., whilst the surface temperatures have a value of approximately 275 and 240° C.

Figure 10:
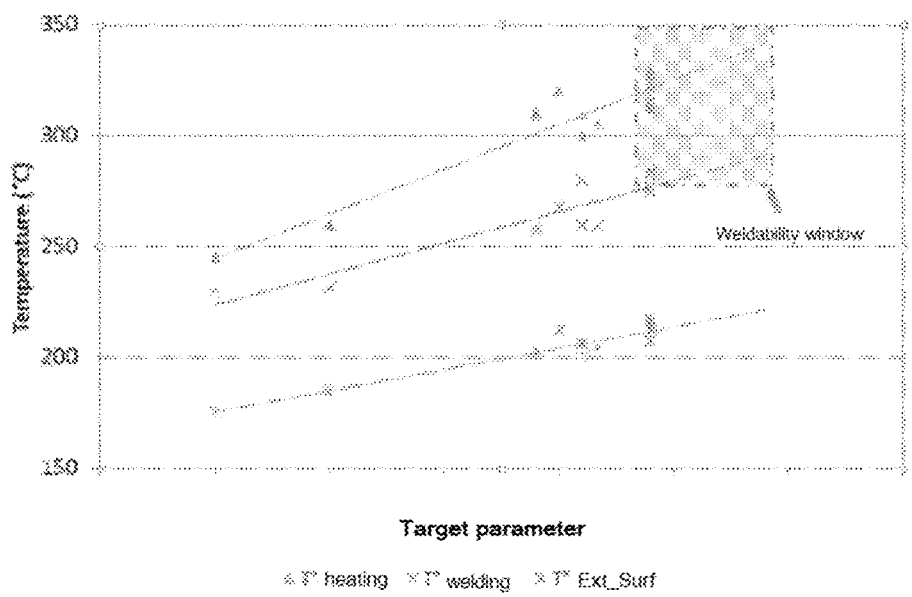
FIG. 10 is a graphic representation of the heating, welding, and surface temperatures of a test piece as a function the configuration of set points, measured by a thermal camera in the intermediate zone during assembly by welding according to the method according to the invention.

Determining the Weldability Window Using a Test Piece with a 5HS/PPS Reinforcing Weave FIG. 10 is a graphic representation of the heating, welding, and surface temperatures (° C.) measured/recorded as a function of various configurations of the evaluation method.

The temperature range of the weldability window is delimited by the melting point of the thermoplastic matrix (lower limit) and the degradation temperature of the thermoplastic matrix (upper limit). By measuring the surface and internal temperatures—in particular the surface, heating, and welding temperatures—with various configurations, it is possible to determine the configurations at which the surface and internal temperatures correspond to the weldability window as shown in FIG. 10. These configurations may be used to weld the parts, of which the test piece is a representative sample.

The invention claimed is:

1. A method for evaluating parameters of a method for assembly by welding, comprising:
   providing a test piece comprising at least two parts comprising thermoplastic materials; wherein at least one of the at least two parts is a perforated reference part comprising at least one perforation configured to allow for measurement of an internal temperature of the test piece;
   providing a welding installation comprising at least one heating element and at least one temperature sensor;
   heating a welding area of the at least two parts with the at least one heating element to cause welding; and
   measuring at least one internal temperature of the welding area at a level of the at least one perforation by means of the at least one temperature sensor;
   wherein the heating element and the at least one temperature sensor move in a welding direction D relative to the at least two parts during welding.

2. The method according to claim 1, wherein the at least one heating element is an insert, wherein the insert is inserted between surfaces to be welded of the at least two parts during heating.

3. The method according to claim 2, wherein the insert is heated by induction, by resistance, by friction, by ultrasound, by using a laser through a hot gas stream, or by conduction from an external heat source.

4. The method according to claim 1, wherein the at least one perforation is a perforation that traverses the all or part of the thickness of the perforated reference part.

5. The method according to claim 1, wherein the at least one perforation has a square, rectangular, or circular cross-section.

6. The method according to claim 1, wherein the perforated reference part comprises at least two perforations that are aligned perpendicular and/or parallel to the welding direction.

7. The method according to claim 1, wherein the perforated reference part comprises a first section that is perforated, a second section that is not perforated, and a third section that is perforated; wherein the second section is between the first section and the third section.

8. The method according to claim 1, further comprising measuring at least one temperature of a free surface of the perforated reference part opposite a surface to be welded.

9. The method according to claim 1, wherein measuring comprises measuring the surface temperature and the internal temperature transversely and/or longitudinally relative to the welding direction.

10. The method according to claim 1, further comprising recording temperature values detected during measuring.

11. The method according to claim 1, further comprising comparing temperatures detected during measuring with reference temperatures.

12. The method according to claim 1, further comprising a step of calibrating the parameters.

\* \* \* \* \*